US010415462B2

(12) United States Patent
Gerard et al.

(10) Patent No.: US 10,415,462 B2
(45) Date of Patent: Sep. 17, 2019

(54) VARIABLE-NOZZLE TURBINE WITH MEANS FOR RADIAL LOCATING OF VARIABLE-NOZZLE CARTRIDGE (71) Applicant: Honeywell International Inc., Morris Plains, NJ (US)

(72) Inventors: Arnaud Gerard, Epinal (FR); Romain Chicot, Epinal (FR); Mohamed Tahyry, Epinal (FR); Vincent Eumont, Epinal (FR); Nicolas Gaineton, Epinal (FR); Jean-Michel Geoffroy, Epinal (FR); Francis Abel, Epinal (FR); Bassam Chammas, Epinal (FR); Giorgio Figura, Epinal (FR)

(73) Assignee: Garrett Transportation I Inc., Torrance, CA (US)

( * ) Notice: Subject to any disclaimer, the term of this patent is extended or adjusted under 35 U.S.C. 154(b) by 317 days.

(21) Appl. No.: 15/492,872

(22) Filed: Apr. 20, 2017

(65) Prior Publication Data
US 2018/0306104 A1 Oct. 25, 2018

(51) Int. Cl.
F02B 37/24 (2006.01)
F01D 17/16 (2006.01)
(Continued)

(52) U.S. Cl.
CPC ............ *F02B 37/24* (2013.01); *F01D 17/165* (2013.01); *F02C 6/12* (2013.01); *F04D 17/10* (2013.01);
(Continued)

(58) Field of Classification Search
CPC .......... F01D 17/165; F02B 37/24; F02C 6/12; F04D 15/00; F04D 15/0027;
(Continued)

(56) References Cited

U.S. PATENT DOCUMENTS 3,972,644 A * 8/1976 Johnson ................ F01D 17/165
415/163
4,689,960 A * 9/1987 Schroder ................ F02B 37/10
60/607
(Continued)

FOREIGN PATENT DOCUMENTS

DE 112015003130 T5 3/2017
DE 102016216959 A1 4/2017
WO 2017048568 A1 3/2017

OTHER PUBLICATIONS

EPO Search Report and Opinion for EP Appl. No. 18167621.4-1006 dated Jul. 12, 2018.

*Primary Examiner* — Patrick Hamo
*Assistant Examiner* — Joseph S. Herrmann
(74) *Attorney, Agent, or Firm* — John C. James (57) ABSTRACT A turbocharger having a variable-nozzle turbine formed by pivotable vanes supported by a nozzle ring includes a locator that is radially elastically deformable and is disposed between a radially outwardly facing surface of the center housing and an opposing surface of the nozzle ring for radially locating the nozzle ring relative to the center housing. At least one vent is defined in either a radially outermost surface of the locator or the surface of the nozzle ring to allow pressure communication between spaces on axially opposite sides of the locator.

4 Claims, 7 Drawing Sheets (51) Int. Cl.
*F02C 6/12* (2006.01)
*F04D 17/10* (2006.01)

(52) U.S. Cl.
CPC ......... *F05D 2220/40* (2013.01); *Y02T 10/144* (2013.01)

(58) Field of Classification Search
CPC .. F04D 15/0038; F04D 17/10; F05D 2220/40; Y02T 10/144
See application file for complete search history.

(56) References Cited

U.S. PATENT DOCUMENTS

| | | |
|---|---|---|
| 7,559,199 B2 | 7/2009 | Sausse et al. |
| 8,480,358 B2 | 7/2013 | Frank et al. |
| 8,545,172 B2 | 10/2013 | Severin et al. |
| 8,979,508 B2 * | 3/2015 | Mailfert ................. F01D 17/16 417/380 |
| 9,222,367 B2 * | 12/2015 | Inoshita ................. F01D 9/026 |
| 10,006,355 B2 * | 6/2018 | Hayashi ................. F02B 37/24 |
| 10,208,660 B2 * | 2/2019 | Bayod .................... F02B 37/22 |
| 2017/0058764 A1 | 3/2017 | Bayod et al. |
| 2018/0306104 A1 * | 10/2018 | Gerard ................... F02B 37/24 |

* cited by examiner

VARIABLE-NOZZLE TURBINE WITH MEANS FOR RADIAL LOCATING OF VARIABLE-NOZZLE CARTRIDGE

BACKGROUND OF THE INVENTION

The present disclosure relates to turbochargers having a variable-nozzle turbine in which movable vanes are disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger. One type of variable-geometry turbocharger is the variable-nozzle turbocharger (VNT), which includes an array of variable vanes in the turbine nozzle. The vanes are pivotally mounted in the nozzle and are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

The variable vane mechanism is relatively complicated and thus presents a challenge in terms of assembly of the turbocharger. Furthermore, the mechanism is located between the turbine housing, which gets quite hot because of its exposure to exhaust gases, and the center housing, which is at a much lower temperature than the turbine housing. Accordingly, the variable vane mechanism is subject to high temperatures and to thermal stresses because of the noted temperature gradient. All of these factors present a challenge to the radial centering of the variable vane mechanism so that it is substantially concentric with the turbine wheel.

SUMMARY OF THE DISCLOSURE

The present disclosure describes embodiments of turbochargers of the variable-nozzle turbine type noted above, having advantageous locator arrangements for radially locating the nozzle ring relative to the center housing containing the turbocharger bearings. In accordance with a first embodiment, a turbocharger having a variable-nozzle turbine includes:

a turbine comprising a turbine housing and a turbine wheel mounted in the turbine housing and connected to a rotatable shaft for rotation therewith, the turbine housing defining a chamber surrounding the turbine wheel for receiving exhaust gas, and an axially extending bore through which exhaust gas is discharged after passing through the turbine wheel;

a nozzle leading from the chamber generally radially inwardly to the turbine wheel;

a compressor comprising a compressor housing and a compressor wheel mounted in the compressor housing and connected to the rotatable shaft for rotation therewith;

a center housing connected between the compressor housing and the turbine housing and having a nose portion adjacent the turbine wheel defining a generally radially outwardly facing first surface and a second surface that faces generally axially toward the turbine wheel;

a generally annular nozzle ring having a first face comprising one wall of the nozzle and axially spaced from an opposite wall of the nozzle and having an opposite second face, and an array of vanes circumferentially spaced about the nozzle ring and disposed in the nozzle, the vanes being rotatably mounted to the nozzle ring such that the vanes are variable in setting angle for regulating exhaust gas flow to the turbine wheel, the nozzle ring adjacent an inner diameter thereof defining a generally radially inwardly facing third surface spaced from and opposing the first surface of the center housing;

a spring heat shroud that is resiliently axially compressible, the spring heat shroud having a radially outer peripheral portion in contact with a portion of the second face of the nozzle ring, and having a radially inner peripheral portion in contact with the second surface of the center housing that faces toward the turbine wheel, the spring heat shroud being axially compressed between the nozzle ring and the center housing; and a locator comprising a metallic ring disposed between the first surface of the center housing and the opposing third surface of the nozzle ring and serving to radially locate the nozzle ring relative to the center housing, the locator being radially compressible in an elastically deformable manner, the locator having a radially outermost surface and a radially innermost surface, the radially innermost surface of the locator contacting the first surface of the center housing, the radially outermost surface of the locator contacting the third surface of the nozzle ring;

wherein at least one of the radially outermost surface of the locator and the third surface of the nozzle ring defines at least one vent comprising a radially extending recess in said surface, the at least one vent providing fluid pressure communication between spaces on axially opposite sides of the locator.

In some embodiments as described herein, there are a plurality of said vents circumferentially spaced apart about a circumference of the locator.

In accordance with one embodiment, said vents are defined in the third surface of the nozzle ring.

In accordance with another embodiment, said vents are defined in the radially outermost surface of the locator.

BRIEF DESCRIPTION OF THE DRAWINGS

Having described the present disclosure in general terms, reference will now be made to the accompanying drawing(s), which are not necessarily drawn to scale, and wherein.

DETAILED DESCRIPTION OF THE DRAWINGS

The present disclosure will now be described in fuller detail with reference to the above-described drawings, which depict some but not all embodiments of the invention(s) to which the present disclosure pertains. These inventions may be embodied in various forms, including forms not expressly described herein, and should not be construed as limited to the particular exemplary embodiments described herein. In the following description, like numbers refer to like elements throughout.

Figure 1:
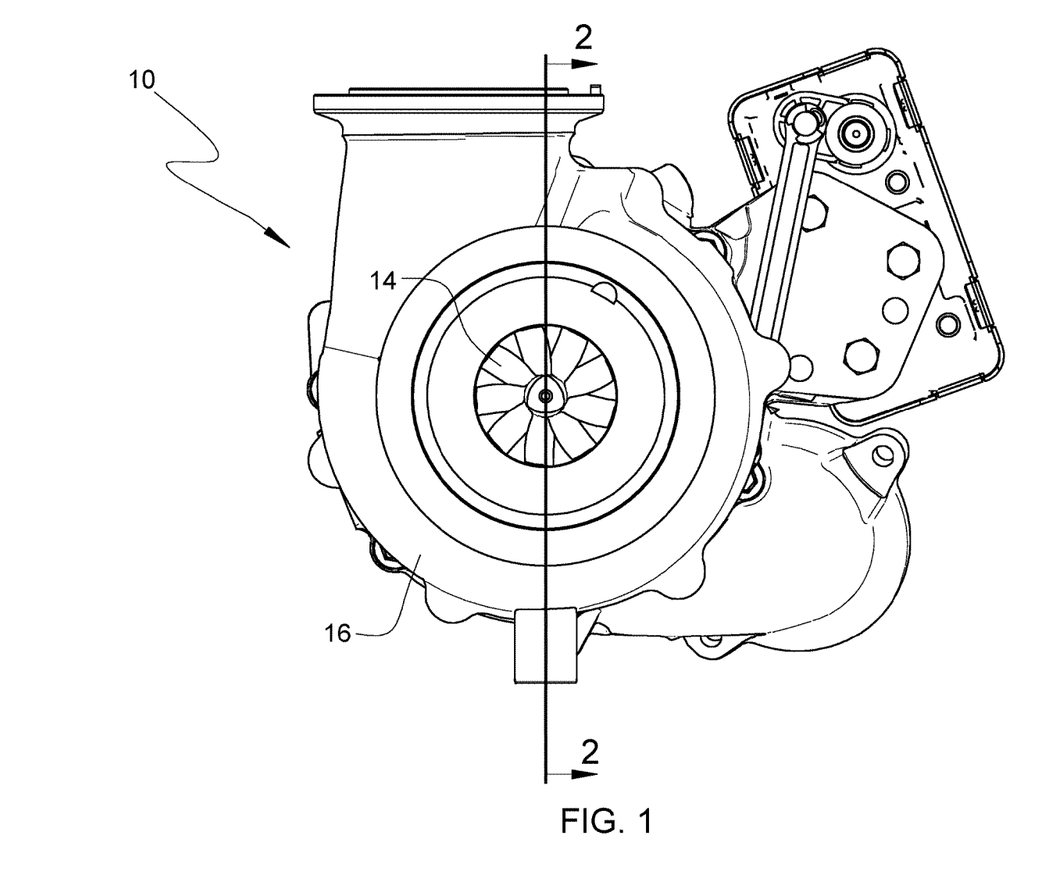
FIG. 1 is an axial end view of a turbocharger in accordance with embodiments of the invention.
Figure 2:
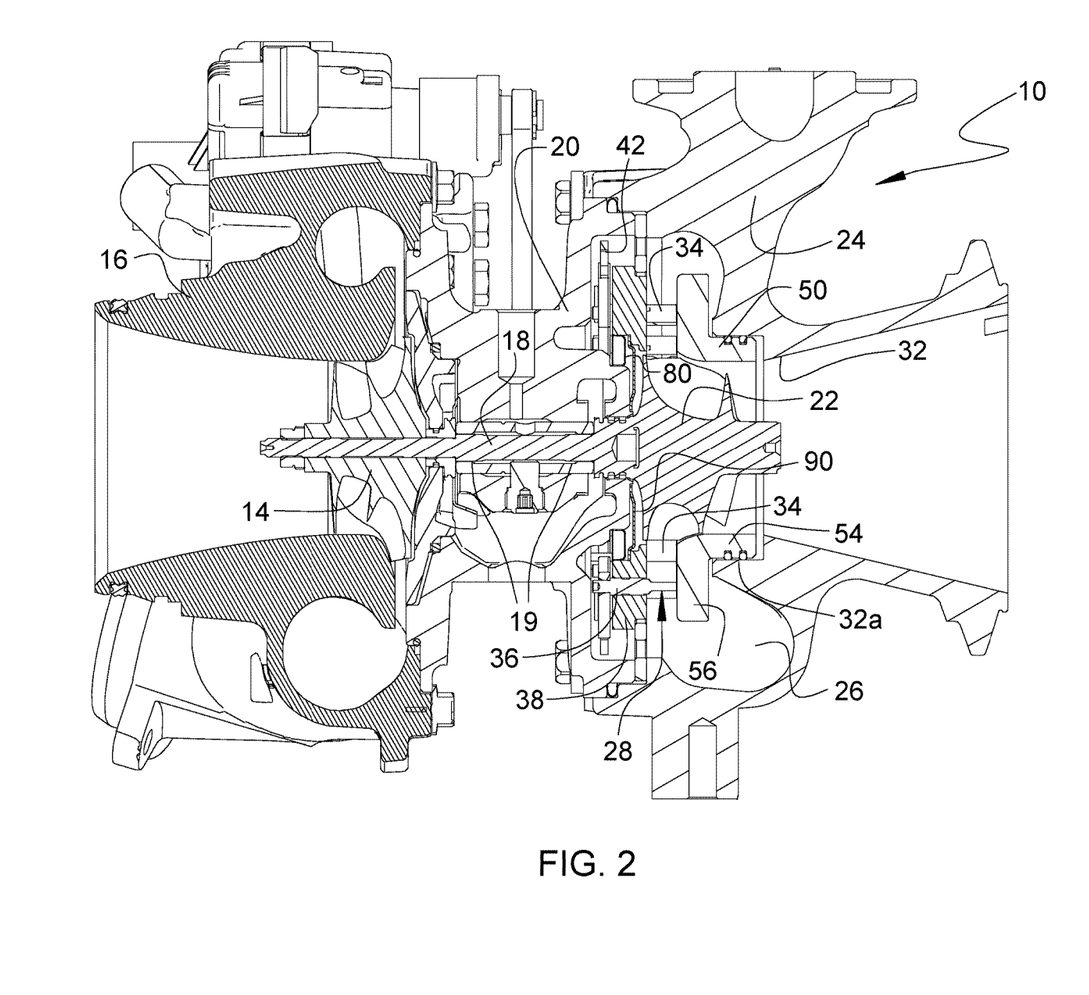
FIG. 2 is a cross-sectional view along line 2-2 in FIG. 1.

The present invention pertains to turbochargers that include a variable-nozzle turbine (VNT), wherein the variable nozzle comprises an array of pivotable vanes mounted on a nozzle ring. FIGS. 1 and 2 illustrate a VNT turbocharger 10 that is of the type to which the present invention pertains. The turbocharger includes a compressor wheel or impeller 14 mounted on one end of a rotatable shaft 18 and disposed in a compressor housing 16. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flows through the passages between the blades of the turbine wheel, the gas is expanded to a lower pressure, and the gas discharged from the wheel exits the turbine housing through a generally axial bore 32 therein.

Figure 3:
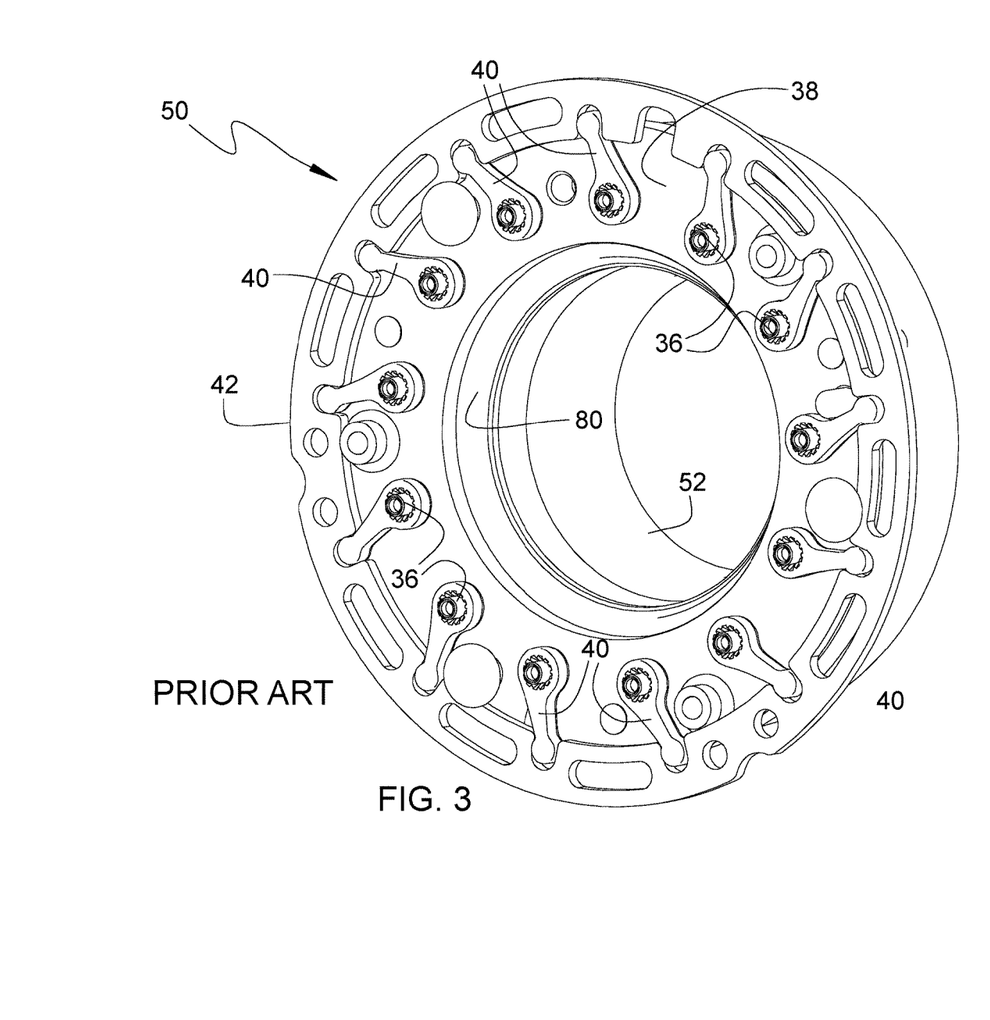
FIG. 3 is a perspective view of a variable-nozzle assembly for a turbocharger in accordance with a prior-art embodiment.

The turbine nozzle 28 is a variable nozzle for varying the cross-sectional flow area and flow direction through the nozzle so as to regulate flow into the turbine wheel. With reference to FIGS. 2 and 3, the variable nozzle includes a plurality of vanes 34 that are circumferentially spaced about the nozzle. Each vane is affixed to a pin 36 that passes through an aperture in a generally annular nozzle ring 38 that is mounted coaxially with respect to the turbine wheel 22. Each pin 36 is rotatable about its axis for rotating the attached vane. The nozzle ring 38 forms one wall of the flow passage of the nozzle 28. Each of the pins 36 has a vane arm 40 affixed to an end of the pin that protrudes out from the nozzle ring 38, and is engaged by a generally annular unison ring 42 (also referred to as an actuator ring) that is rotatable about its axis and that is coaxial with the nozzle ring 38. An actuator (not shown) is connected to the unison ring 42 for rotating it about its axis. When the unison ring is rotated, the vane arms 40 are rotated to cause the pins 36 to rotate about their axes, thereby rotating the vanes 34 so as to vary the cross-sectional flow area and flow direction through the nozzle 28.

In the turbocharger 10, the variable vane mechanism is provided in the form of a cartridge 50 that is installable into and removable from the turbocharger as a unit. The cartridge 50 comprises the nozzle ring 38, vanes 34, pins 36, vane arms 40, and unison ring 42. The cartridge further comprises an insert 52 that has a tubular portion 54 sealingly received into a portion 32a of the bore 32 of the turbine housing, and a nozzle portion 56 extending generally radially out from one end of the tubular portion 54, the nozzle portion 56 being axially spaced from the nozzle ring 38 such that the vanes 34 extend between the nozzle ring 38 and the nozzle portion 56. The radially outer surface of the tubular portion 54 has one or more axially spaced circumferential grooves in each of which a sealing ring is retained for sealingly engaging the inner surface of the bore portion 32a.

A plurality of spacers (not shown) are connected between the nozzle ring 38 and the nozzle portion 56 of the insert 52 for securing the nozzle ring to the insert and maintaining the desired axial spacing between the nozzle ring 38 and the nozzle portion 56. Advantageously, the spacers are formed of a material having good high-temperature mechanical properties and a relatively low thermal conductivity, such as stainless steel (e.g., grade 310 stainless steel) or the like, so that the nozzle ring 38 and insert 52 are effectively thermally decoupled from each other.

Figure 4:
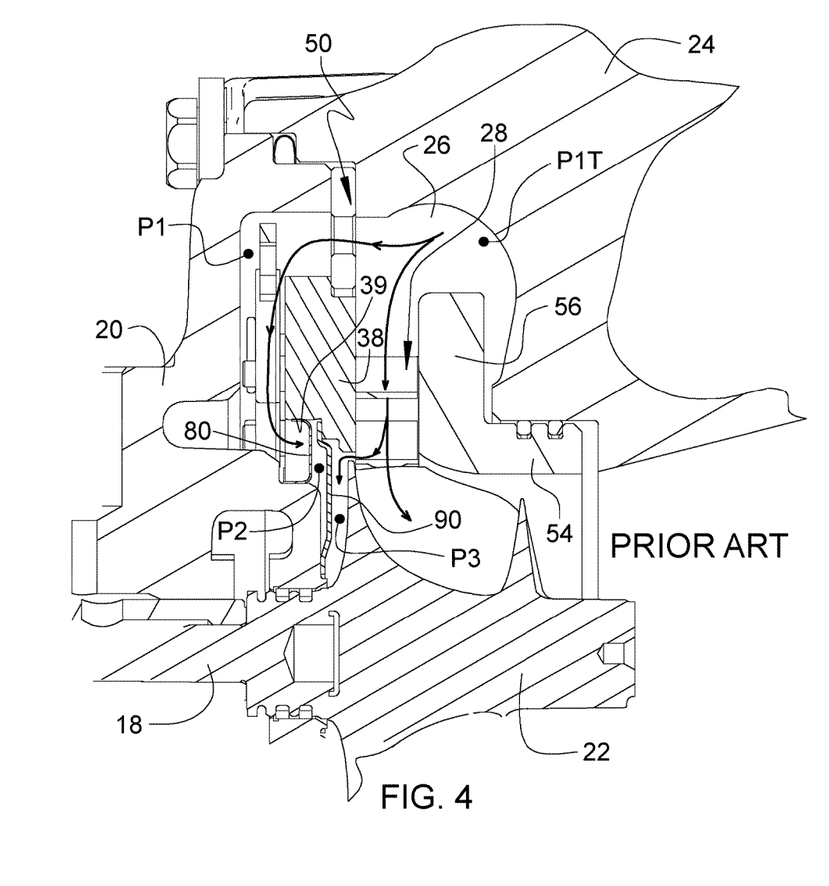
FIG. 4 is a fragmentary axial cross-sectional view of a turbocharger in accordance with the prior-art embodiment of FIG. 3.

FIGS. 3 and 4 illustrate the cartridge 50 in accordance with an embodiment that does not include the features of the present invention. The cartridge further comprises a metallic locator ring 80 that is retained between the nozzle ring 38 and the center housing 20 when the cartridge is installed onto the center housing. The locator ring 80 can have a C-shaped cross-section as shown, or alternatively can have an S-shaped cross-section, and is formed to be radially compressible in an elastically resilient manner between the nozzle ring and the center housing. The locator has a radially innermost surface that engages a radially outwardly facing surface of the center housing 20 so as to establish substantial concentricity between the center housing and locator ring. The radially outermost surface of the locator ring 80 engages a radially inwardly facing locating surface 39 (FIG. 4) of the nozzle ring 38 so as to radially locate the nozzle ring substantially concentric with the locator ring, and therefore with the center housing. In this manner, the concentricity of the nozzle ring 38 with respect to the center housing (and therefore with respect to the turbine wheel 22) is established.

The turbocharger 10 further includes a spring heat shroud 90 formed of a high-temperature-resistant sheet metal. A radially inner peripheral portion of the spring heat shroud contacts an axially facing surface of the center housing that faces the turbine wheel 22, and a radially outer peripheral portion of the spring heat shroud contacts an axially facing surface of the nozzle ring 38 facing toward the center housing. The spring heat shroud is axially compressed between the center housing and the nozzle ring and serves to exert an axial force on the nozzle ring 38 toward the insert 52 (to the right in FIG. 4). The spring heat shroud also serves as a heat shroud between the turbine and the center housing.

The turbocharger 10 having the variable-nozzle cartridge 50 located by the C-shaped locator ring 80 in accordance with the prior art has proven to be an advantageous construction, but further improvements are sought. In particular, improvements are sought with respect to the locator for the nozzle ring 38. One drawback of the locator 80 is now explained with reference to FIG. 4. The total pressure of the exhaust gas in the turbine housing chamber 26 is P1T. Most of the exhaust gas flows through the variable nozzle 28 to the turbine wheel 22. However, a small fraction of the exhaust gas leaks into the VNT chamber where the unison ring 42 and vane arms are located; the pressure in this VNT chamber is denoted P1, which is significantly lower than P1T. There is also a small leakage flow from the nozzle 28 past the outer periphery of the turbine wheel 22 into the shroud/wheel cavity; the pressure in the shroud/wheel cavity is denoted P3, which is a fraction of P1T as a function of the setting angles of the vanes 34. In general, P3 is less than P1. The locator/shroud cavity, disposed between the locator 80 and the spring heat shroud 90, is sealed because the full outer periphery of the locator contacts a cylindrical surface 39 of the nozzle ring, and the full inner periphery of the locator contacts a cylindrical surface of the center housing 20. Similarly, the spring heat shroud 90 is in full contact with the center housing and with the nozzle ring. Consequently, the pressure P2 in the locator/shroud cavity is governed by a slight leakage flow past either the locator or the heat shroud, and therefore P2 is lower than P3. The result is that there is a negative pressure differential across the spring heat shroud, which acts in a direction (to the left in FIG. 4) to reduce the biasing force of the spring heat shroud on the nozzle ring 38. The present invention is aimed at reducing or eliminating this negative pressure differential on the spring heat shroud.

Figure 5:
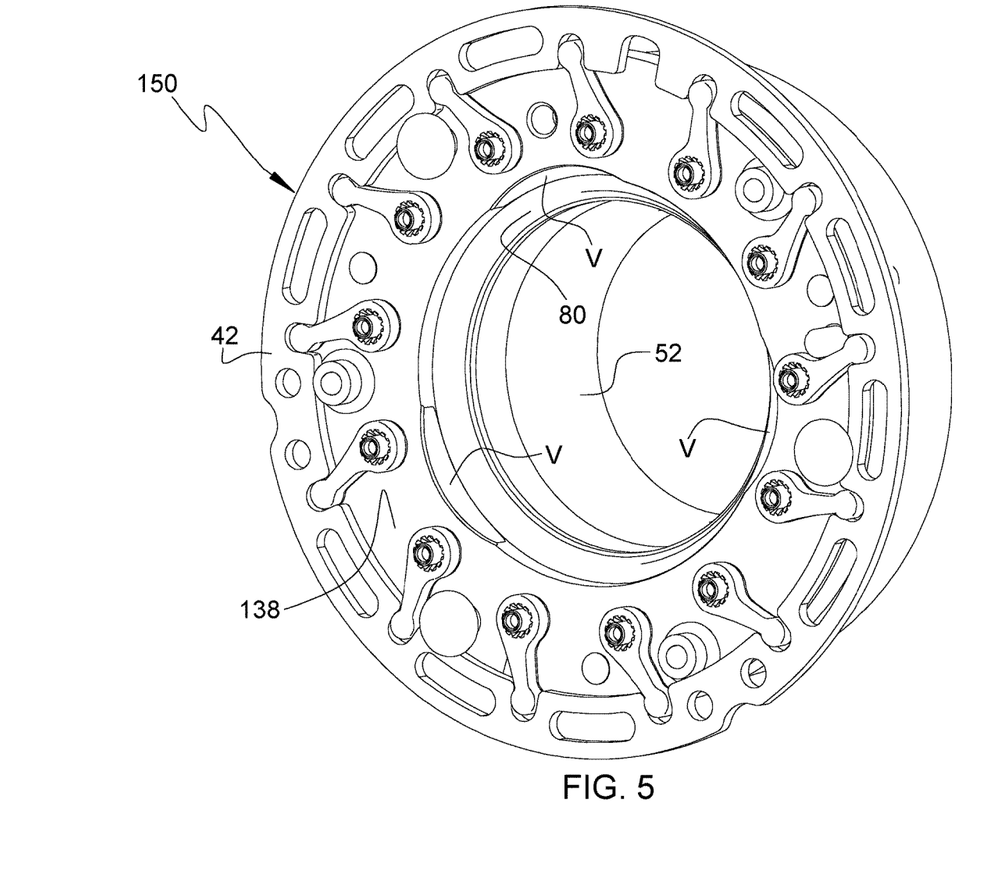
FIG. 5 is a perspective view of a variable-nozzle assembly of a turbocharger, in accordance with a first embodiment of the invention.
Figure 6:
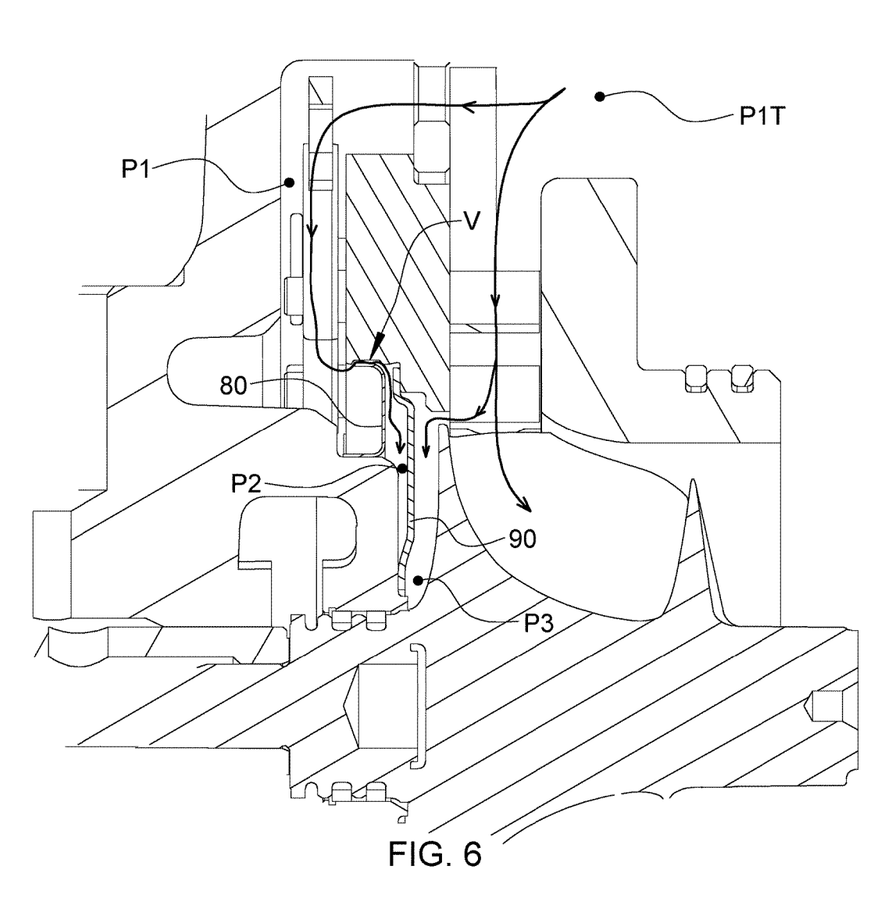
FIG. 6 is a fragmentary axial cross-sectional view of a turbocharger in accordance with the embodiment of FIG. 5.

In this regard, a first embodiment of the present invention is depicted in FIGS. 5 and 6. FIG. 5 shows a modified variable nozzle cartridge 150 that is substantially similar to the corresponding cartridge 50 of the prior-art described above. However, the modified cartridge includes a "vented" nozzle ring 138 that differs from the nozzle ring 38 of the prior art cartridge. In particular, the radially inwardly facing surface (see surface 39 in FIG. 4) of the nozzle ring defines at least one vent V comprising a radially outwardly extending recess in the otherwise-cylindrical surface of the nozzle ring that is contacted by the radially outermost surface of the locator 80. There can be a plurality of such vents; in the illustrated embodiment there are three vents V circumferentially spaced about the circumference of the locator 80, but the invention is not limited to any particular number of vents. Exhaust gas can pass through the vent(s) into the locator/shroud cavity, with the result that the pressure P2 in the locator/shroud cavity is substantially the same as the pressure P1 in the VNT cavity. The result is that P2 in the locator/shroud cavity is higher than the pressure P3 in the shroud/wheel cavity. Therefore, there is a positive pressure differential across the spring heat shroud 90, which reinforces the biasing force on the nozzle ring 138.

Figure 7:
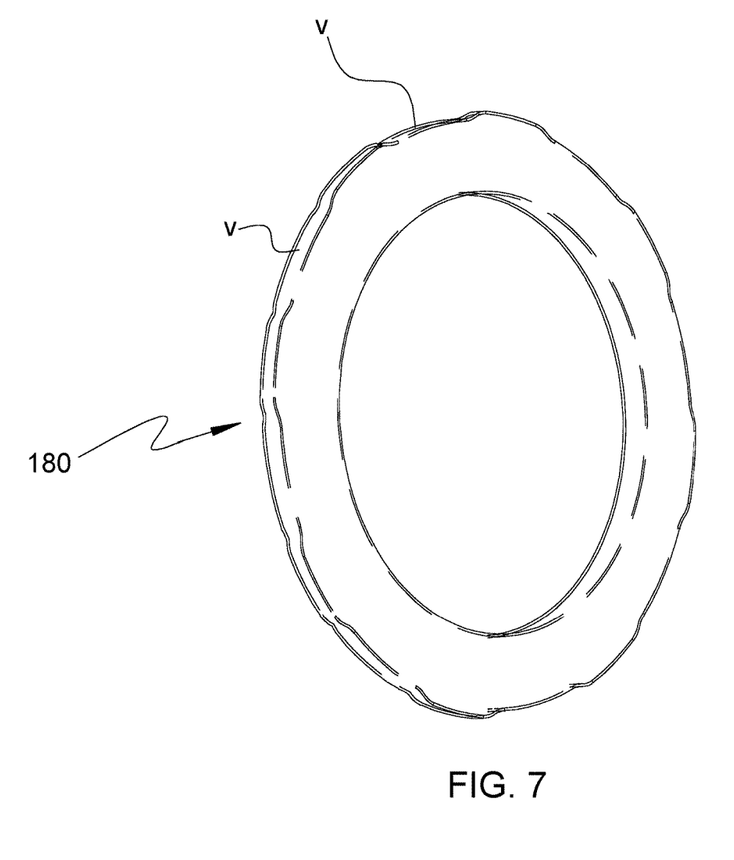
FIG. 7 is a perspective view of a vented locator in accordance with a second embodiment of the invention.

A second embodiment of the invention is depicted in FIG. 7. Instead of employing a vented nozzle ring as in the prior embodiment, a similar result can be obtained by using a vented locator 180 as illustrated in FIG. 7. The vented locator includes at least one vent V comprising a radially inwardly extending recess in the otherwise-cylindrical outermost surface of the locator that contacts the nozzle ring. There can be a plurality of circumferentially spaced vents as in the illustrated embodiment. Because the locator includes vents, the surface of the nozzle ring that engages the locator can be cylindrical rather than vented. It is also possible, however, to employ both a vented nozzle ring and a vented locator, each defining at least one vent as described.

Persons skilled in the art, on the basis of the present disclosure, will recognize that modifications and other embodiments of the inventions described herein can be made without departing from the inventive concepts described herein. Specific terms used herein are employed for explanatory purposes rather than purposes of limitation. Accordingly, the inventions are not to be limited to the specific embodiments disclosed, and modifications and other embodiments are intended to be included within the scope of the appended claims.

What is claimed is:

1. A turbocharger having a variable-nozzle turbine, comprising:
   a turbine comprising a turbine housing and a turbine wheel mounted in the turbine housing and connected to a rotatable shaft for rotation therewith, the turbine housing defining a chamber surrounding the turbine wheel for receiving exhaust gas flow, and an axially extending bore through which exhaust gas is discharged after passing through the turbine wheel;
   a nozzle leading from the chamber generally radially inward to the turbine wheel;
   a compressor comprising a compressor housing and a compressor wheel mounted in the compressor housing and connected to the rotatable shaft for rotation therewith;
   a center housing connected between the compressor housing and the turbine housing and having a nose portion adjacent the turbine wheel defining a generally radially outward facing first surface and a second surface that faces generally axially toward the turbine wheel;
   a generally annular nozzle ring having a first face comprising one wall of the nozzle and axially spaced from an opposite wall of the nozzle and having an opposite second face, and an array of vanes circumferentially spaced about the generally annular nozzle ring and disposed in the nozzle, the array of vanes being rotatably mounted to the generally annular nozzle ring such that the array of vanes are variable in setting angle for regulating the exhaust gas flow to the turbine wheel, the generally annular nozzle ring adjacent an inner diameter thereof defining a generally radially inward facing third surface spaced apart from and opposing the first surface of the nose portion of the center housing;
   a spring heat shroud that is resiliently axially compressible, the spring heat shroud having a radially outer peripheral portion in contact with a portion of the second face of the generally annular nozzle ring, and having a radially inner peripheral portion in contact with the second surface of the nose portion of the center housing that faces toward the turbine wheel, the spring heat shroud being axially compressed between the generally annular nozzle ring and the nose portion of the center housing; and
   a locator defined by a metallic ring disposed between the first surface of the nose portion of the center housing and the opposing third surface of the generally annular nozzle ring and serving to radially locate the nozzle ring relative to the center housing, the locator being radially compressible in an elastically deformable manner, the locator having a radially outermost surface and a radially innermost surface, the radially innermost surface of the locator contacting the first surface of the nose portion of the center housing, the radially outermost surface of the locator contacting the third surface of the generally annular nozzle ring;

wherein at least one of the radially outermost surface of the locator and the third surface of the generally annular nozzle ring defines at least one vent comprising a radially extending recess in said at least one surface, the at least one vent providing fluid pressure communication between spaces ($P_1, P_2$) on axially opposite sides of the locator.

2. The turbocharger of claim 1, wherein the at least one vent is a plurality of said vents which are circumferentially spaced apart about a circumference of the locator.

3. The turbocharger of claim 2, wherein the plurality of said vents are defined in the third surface of the generally annular nozzle ring.

4. The turbocharger of claim 2, wherein the plurality of said vents are defined in the radially outermost surface of the locator.

* * * * *